United States Patent [19]
Orth et al.

[11] 3,770,007
[45] Nov. 6, 1973

[54] DUAL DIRECTION FLOW CONTROL VALVE

[75] Inventors: Harold R. Orth, Hinsdale; Kestutis Biskis, Downers Grove; Rudolph E. Yeh, Elmhurst, all of Ill.

[73] Assignee: International Harvester Company, Chicago, Ill.

[22] Filed: Apr. 21, 1972

[21] Appl. No.: 246,449

[52] U.S. Cl. ................................ 137/501, 137/493
[51] Int. Cl. ...................... F16k 17/22, F15b 11/04
[58] Field of Search .................... 137/501, 504, 503, 137/500, 493

[56] References Cited
UNITED STATES PATENTS
3,596,677  8/1971  Clark .................................. 137/501
3,601,150  8/1971  Mito ................................... 137/501
2,990,847  7/1961  Absalom .......................... 137/501 X
3,524,386  8/1970  Cudnohufsky ................... 137/501 X

*Primary Examiner*—Henry T. Klinksiek
*Assistant Examiner*—Robert J. Miller
*Attorney*—Floyd B. Harman

[57] ABSTRACT

A control valve which has a variable orifice valve located across the pressure fluid passage. The resulting pressure change is communicated by a channel system to two power chambers which control the movement of a pressure compensating spool also located in the pressure fluid passage thereby regulating fluid flow.

9 Claims, 6 Drawing Figures

PATENTED NOV 6 1973 3,770,007

DUAL DIRECTION FLOW CONTROL VALVE

BACKGROUND OF THE INVENTION

The present invention relates to hydraulic flow controlling apparatus and more particularly, to an improved valve apparatus for controlling the flow of pressurized fluid to and from draft control systems and the like.

Hydraulic circuits often require a constant rate of fluid flow to a component regardless of operating pressures or flow to other parts of the circuit. A simple orifice cannot be used because its flow would vary with the operating pressures of the components. The flow is conventionally controlled with a flow control valve consisting of an orifice and a spool valve. This system works well in circuits that require flow in one direction only. If reverse flow is involved, two flow control valves are needed with some complication of circuitry to assure flow through the proper valve and to prevent short circuiting.

SUMMARY OF THE INVENTION

In accordance with the invention, a control valve device having first and second ports with a spool carrying passageway connecting the ports is provided. A valve or pressure sensing means is provided in the connecting passageway for creating a pressure differential thereacross. The pressure differential is communicated to the spool which responds by either opening or closing, depending upon whether the input hydraulic fluid pressure increases or decreases. As is apparent, once the flow control valve is adjusted for a given flow rate any subsequent changes in input hydraulic fluid pressure will be compensated for by the pressure operated spool such that the rate of output remains the same. Further, the control valve device operates in the same manner when the roles of the input and output or first and second ports are reversed.

Accordingly, an object of the invention is to provide a control valve for controlling the volume of fluid flowing to and from a component.

A further object of the invention is to provide a control valve which automatically maintains a constant rate of fluid flow in both directions once adjusted.

Another object of the invention is to provide a control valve for controlling the volume of fluid in either an open or closed center system.

Yet another object of the invention is to provide an adjustable rotary orifice valve.

Still another object of the invention is to provide a control valve which meters one flow rate in one direction and another flow rate in the other.

With the foregoing and other objects in view, which will be made manifest in the following detailed description and specifically pointed out in the appended claims, reference is had to the accompanying drawings for an illustrative embodiment of the invention wherein:

DESCRIPTION OF THE PREFERRED EMBODIMENT

Figure 1:
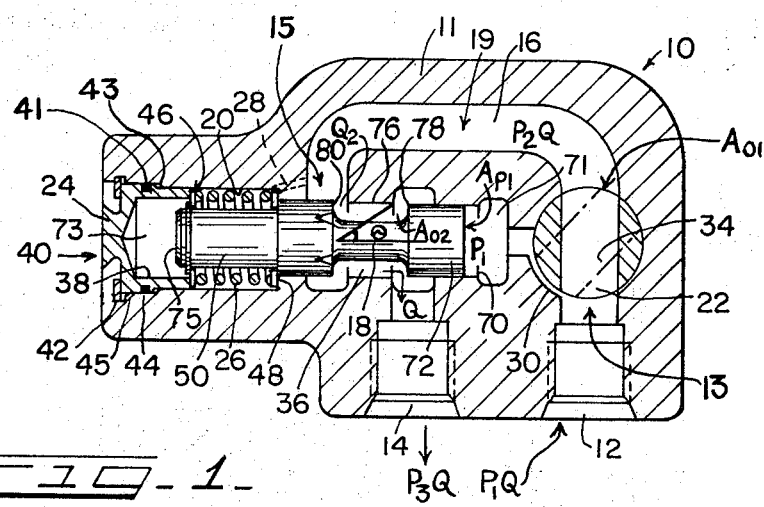
FIG. 1 is a side sectional view of a valve construction in a neutral position embodying the features of the present invention.

Referring now to FIG. 1 of the drawing, there is illustrated a closed center hydraulic fluid control valve device generally designated as 10 including a body means 11, a first and second port passage means 12, and 14, a passage means 19 which includes a delivery passage means 16 and a bore means 20 connecting the port passage means. Bore means 20, the end means 21 thereof being sealed by plug means 24 carries a spool means 18 such that reciprocative movement thereof is possible. Spool 18 is urged into a neutral position by spring means 26 which resists movement thereof, however movement is prompted by high pressure fluid passing through flow sensing means 13 and pressure balancing means 15.

The control valve 10 serves to allow control of the volume of fluid flowing in both directions independently of the pressure to which the fluid is subjected. That is, a dual direction flow control valve which provides variable or fixed flow control in both directions.

Figure 2:
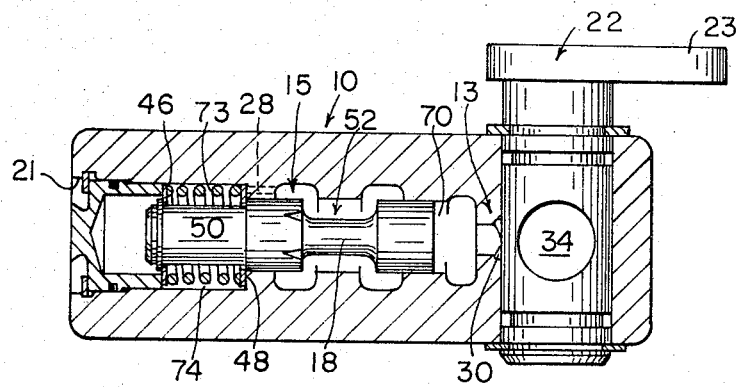
FIG. 2 is a top sectional view of the valve construction of FIG. 1.

In general, first flow sensing means 13 includes valve means 22 having a variable or adjustable orifice means 32 and a channel means 30. The valve means 22 intersects the delivery passage 16 such that a controllable pressure differential is created thereacross. In the embodiment shown in FIG. 1, valve means 22 is a rotary valve means having a uniform transverse bore means 34 extending therethrough. As shown in FIG. 2, valve means 22 can be provided with a handle means 23, which may, in turn be infinitely adjustable or lockable in certain fixed positions. Rotary valves are generally not used in hydraulic applications such as this because the high side loads resulting when closed make operation difficult. In this case, however, the rotary valve functions as a variable orifice and does not close entirely, resulting in only a low pressure drop across the valve. A channel or groove means 30 is provided in body 11 which communicates between first port means 12 and the end of the spool valve 72 to power chamber means 71. Movement of the valve 22 serves to control the volume of fluid which passes to the spool 18 thereby creating a pressure differential between the first port means 12 and the bore chamber means 36.

The bore chamber 36 is part of bore 20 which, as previously stated, is sealed with a plug means 24 to prevent the loss of high pressure fluid. Plug means 24 has a bored center 38 to receive the end of valve spool 52 and a grooved or beveled face 40 to facilitate positioning of snap ring 42 and gripping during removal. As shown in FIG. 1, the outer surface means 41 has a taper means 43 and a shoulder means 45 to allow easier alignment during assembly. A snap ring means 42 secures the unit in place and rubber seal means 44 insures against hydraulic fluid leaks. The leading edge means 46 of plug 24 provides one support for compressing centering spring 26, a shoulder means 48 in bore 20 provides the other.

Figure 3:
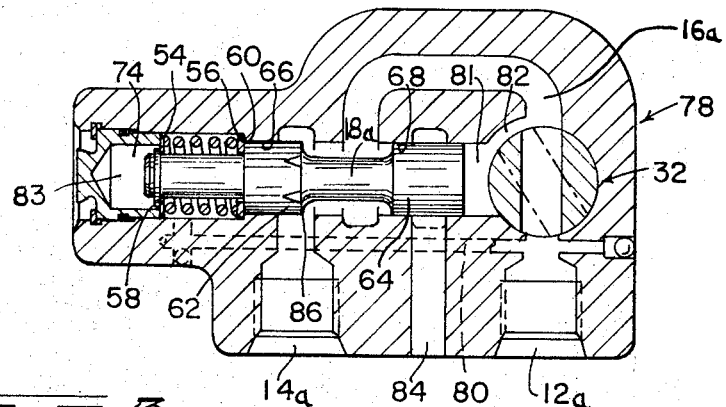
FIG. 3 is a side sectional view of a valve construction embodying the features of the present invention as adapted to an open center system.

Spool means 18 includes a first spring supporting section means 50 and a second grooved section means 52. Spring section 50 journals spring means 26, as shown in FIGS. 2 and 3, and provides support for washer means 54 and 56, washer means 54 being secured by means of a retainer ring 58. As spool 18 moves to the left, washer 56 is lifted off shoulder 48 by shoulder on spool valve 18 and washer 54 is supported by leading edge 46 causing spring 26 to compress. In a corresponding manner, when the valve spool moves to the right, retaining ring 58 lifts washer 54 from leading edge 46 and washer 56 is supported by shoulder 48 again compressing spring 26.

Grooved spool section 52 is generally dumbell shaped, first and second land means 62 and 64 thereof forming fluid seals with the corresponding adjacent wall means 66 and 68 of bore chamber 36 as spool means 18 moves either to the left or the right.

Bore chamber 36 is provided with a land means 76 of sufficient diameter such that as spool 18 moves to the left, a complete fluid seal is ultimately formed with shoulder 78 of second land 64. As is apparent, a corresponding fluid seal is achieved when spool 18 moves sufficiently to the right, with shoulder 80 of first land 62 cutting off passage means 16. Thus, spool means 18 can cut off flow through delivery passage 16 or second port passage 14 as well as provide an infinite range of flow positions and rates.

Section 70 of bore chamber 36 in conjunction with effective surface means 72 and fluid channel 30 comprises a hydraulic chamber 71 effective for urging spool means 18 to the left. As is apparent, when spool 18 moves to the left, section 50 thereof journals center bore 38 of plug 24 and second portion 64 restricts fluid flow to second port means 14.

A corresponding hydraulic chamber 73 for urging spool means to the right is comprised of bore secton 74, channel means 28 and effective surface means 75.

As is apparent, flow sensing means 13 senses the flow which results in spool 18 being moved to control that flow maintaining a constant rate.

In the operation of a preferred embodiment as shown in FIG. 1, fluid enters first port passage or receiving passage means 12 and passes through orifice valve means 22 into delivery passage 16. Inlet pressure is simultaneously communicated therewith to the power chamber 71 by channel means 30. That is, valve means 22 creates a pressure drop or differential between power chambers 71 and 73. The differential being dependent on the inlet flow and orientation of bore means 34 of valve 22. Fluid passing through delivery passage 16 is communicated through channel means 28 to power chamber 73. The remainder passes through bore chamber 36 and through second port means 14. For reverse flow, fluid enters second port or discharge passage means 14 and exits through first port 12.

The spool means 18 reacts the the flow rate because the higher pressure at first port 12 is communicated to power chamber 71, while the lower pressure in delivery passage 16 is communicated to power chamber 73. That is, after the desired flow rate has been initially set with valve 22 and a balanced system is achieved, subsequent changes in flow and the corresponding pressure drop across orifice 22 are compensated for by spool means 18 opening or closing second port 14 to maintain the flow rate as originally set. As is apparent, after valve 22 has been positioned, an increase in flow at first port 12 will increase the pressure drop across orifice 22 and the pressure increase in power chamber 71 will cause movement to the left. The spool 18 moves to the left and restricts second port 14 such that the original flow therethrough is maintained. When the pressure at first port 12 decreases, the balanced system is again upset and spool 18 moves to open second port 14. Spring 26 is pre-loaded to resist movement of spool 18 in either direction and to maintain it in a neutral position with respect to delivery passage 16 and second port 14, however, when the unit is actuated, a balance is achieved against the action of spring 26. Thus, the movement of spool 18 is prompted by changes in the pressure between hydraulic chamgers 71 and 73 and the force of spring 26 attempting to shift spool 18 to a neutral position.

Reversing the direction of flow, that is, when fluid enters second port 14, flow sensing means 13 and pressure balancing means 15 will be employed as above. Pressure balancing means 15 includes channel means 28, power chamber 73 and grooved section 52. As is apparent, since channel 28 is downstream (in reversed flow) of grooved section 52, the pressure drop is again measured across valve means 22. A differential is thus developed between power chamber means 71 and 73. Consequently, spool 18 will shift to the right and first portion 80 employed to maintain a constant rate.

FIG. 3 shows a dual direction flow control valve, modified for open center use, connected to a single acting cylinder (not shown) as might be used in a draft control circuit of an open center hydraulic system. To lift the load, fluid enters second port means 14a and exits first port means 12a enroute to the cylinder. Pressure at first port 12a is communicated to power chamber means 83 of spool means 18a through channel means 80, while the pressure in delivery passage 16a is communicated to power chamber means 81 at the right end of the spool 18a by channel means 82. Excess flow therethrough creates a pressure drop across the valve means 32 resulting in higher pressure in chamber 81 than in chamber 83. The pressure differential forces spool 18a to the left opening dump passage 84 discharging excess flow to tank (not shown) or some other downstream application.

When lowering the load, fluid enters first port 12 and exits second port 14. In this case, excess flow causes a higher pressure in chamber 83 than in chamber 81 forcing spool 18a to the right restricting the flow through port means 86. Dump passage 84 does not open.

The spool 18a throttles flow only when lowering the load as it is necessary to restrict the fluid coming from the cylinder (not shown). When raising the load, fluid is supplied by the pump (not shown) and restriction is undesirable in an open center system because excess pressure would be developed. By discharging rather than restricting the excess flow, only enough pressure is developed to lift the load, resulting in a lower horsepower loss than would be the case if a restriction were used. The constant pressure system uses throttling to an advantage, as the system delivers only enough flow to maintain full pressure and the lift rate is best controlled by restricting the flow and maintaining the pressure for minimum horsepower loss. Open center systems, therefore, require the bypass type of control while closed center systems use the restriction type of control.

Figure 4:
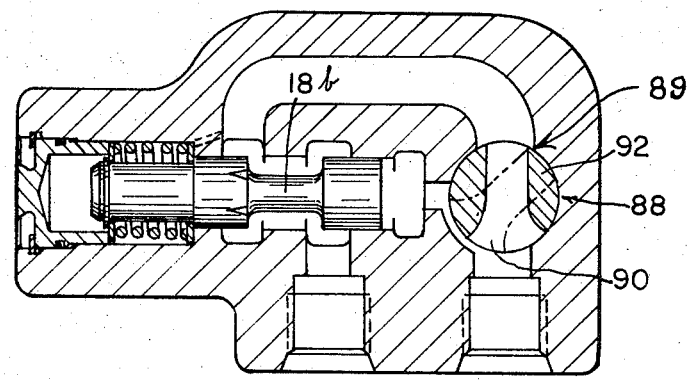
FIG. 4 is a side sectional view of the valve construction of FIG. 1 embodying a modified orifice valve.

FIG. 4 shows a valve identical in all respects except it has a modified orifice valve means 88 that will provide a different flow rate in each direction. The difference in flow rate results from the shape of the variable orifice means 89, which is rounded on side means 90 and sharp edged on side means 92. The different shapes provide different flow coefficients which result in different pressure differentials depending on direction of flow. As the throttling action of spool means 18b is dependent on the pressure drop across orifice valve 88, the throttling action, and consequently the flow, will be different for different directions of flow. The ratio between inlet and outlet flow will depend on the orifice coefficients of the two sides of the orifice and will remain fixed for a given rate of flow. The orifice 89 could be shaped to provide different orifice coefficients and, consequently different flow ratios, for different settings of the orifice valve 88, if necessary.

Figure 5:
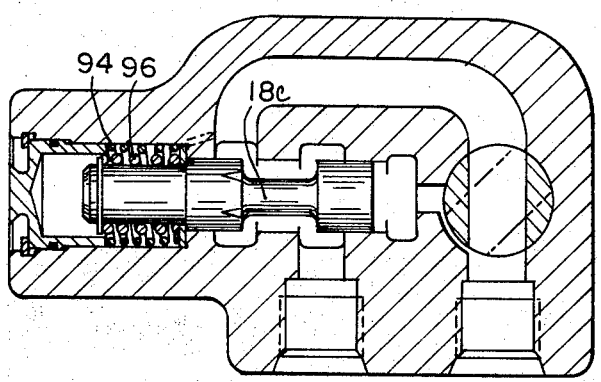
FIG. 5 is a side sectional view of the valve construction of FIG. 1 embodying a modified spring assembly.

FIG. 5 shows a more direct approach to provide dual flow control rates, that is, providing different flow rates depending on from which side fluid is being driven. The spool means 18c employs two spring means 94 and 96 of different characteristics. Springs 94 and 96 are entrapped, as spring 26 in FIG. 1, to provide self centering and can be pre-loaded as desired. The flow rate will depend on the characteristics of the particular spring acting on spool 18c for that direction of flow, as only one spring is used for each direction. Thus, the amount of force generated by the pressure difference necessary to move the spool means 18c will be different in each direction. The ratio between inlet and outlet flow will depend on spring rate, pre-load, etc.

It is apparent that the inlet versus outlet flow rate could be varied requiring different distances of spool travel for a certain throttling effect. Throttling notches in the spool valve 18c could also be including and would add to the effect.

Figure 6:
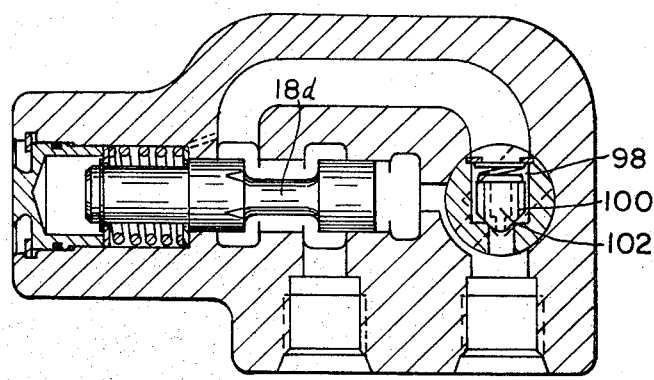
FIG. 6 is a side sectional view of the valve construction of FIG. 1 embodying a modified orifice valve.

Still another means of varying the inlet to outlet flow rates is shown in FIG. 6. The orifice valve means 98 also contains a check valve means 100 which also contains an orifice means 102. In one direction of flow, the check valve 100 closes, leaving only the orifice 102 therein to pass fluid, resulting in a low flow rate requirement to activate the spool means 18d. In the opposite direction of flow, the check valve 100 opens, permitting a higher rate of flow before the spool 18d becomes activated. The ratio of inlet to outlet flow depends on the flow rates of the check valve 100 and the orifice 102 therein.

The theoretical operation of the flow control valve may be described using the embodiment shown in FIG. 1. Supply fluid with pressure $P_1$ is directed to the inlet port 12. The fluid passes through the manually adjustable orifice 22 which has an effective orifice area of $A_{01}$ the fluid pressure is reduced to $P_2$. Pressure $P_1$ and $P_2$ act on the effective surface means 72 having an area $A_{p1}$ and surface means 75 having an area $A_{p2}$ respectively. $A_{p1}$ and $A_{p2}$ are normally made equal in projected area, and they are so assumed here. As a result, the spool is shifted to the left, which decreases the size of the variable orifice $A_{02}$ which exists between shoulder 78 and a metering notch means located on land 76. The fluid throttles through the variable orifice $A_{02}$, and the fluid pressure is further reduced to $P_3$ and is discharged through the outlet port 14. Under steady state and leakage free conditions, the following expressions prevail:

1. Orifice equation
Flow rate through the manually adjustable orifice $A_{01}$ $$Q_1 = K_1 A_{01} [2(P_1 - P_2)/\rho]^{one-half} \quad (1)$$

Flow rate through the variable orifice $A_{02}$ $$Q_2 = K_2 A_{02} [2(P_2 - P_3)/\rho]^{one-half} \quad (2)$$

Where $K_1$ = flow coefficient for orifice $A_{01}$
$K_2$ = flow coefficient for orifice $A_{02}$
$\rho$ = fluid density 2. Continuity flow rate through $A_{01}$ must be equal to flow rate through $A_{02}$ $$Q_1 = Q_2 = Q \quad (3)$$

3. Momentum equation summation of forces acting on the spool along its axis is equal to the change of momentum due to fluid flow in and out of the control volume.

$$P_1 A_{p1} - P_2 A_{p2} - F_s = \rho Q(V_1 - V_2) \cos \theta \quad (4)$$

Since $A_{p1} = A_{p2}$ equation (4) becomes $$A_{p1}(P_1 - P_2) - F_s = \rho Q(V_1 - V_2) \cos \theta \quad (5)$$

Where $F_s$ = spring force
$V_1$ = influx fluid velocity
$V_2$ = efflux fluid velocity
$\theta$ = efflux fluid jet angle with respect to spool axis.

Referring to expression (1), orifice $A_{01}$ is manually set for a desired flow rate, and will remain constant for that flow rate. The flow coefficient, $K_1$, and fluid density, $\rho$, will remain nearly constant for some range of operating conditions. For this reason the product, $K_1$, $A_{01}$, $(2/\rho)^{one-half}$, will remain nearly constant. Expression (1) may be rewritten as:

$$Q = K_1 A_{01} (2/\rho)^{one-half} (P_1 - P_2)^{one-half}$$

$\approx C(P_1 - P_2)^{one-half}$ where $C$ is a constant It becomes obvious that in order to control the flow at nearly constant rate, the pressure differential, $P_1 - P_2$, must be maintained as constant as possible regardless of the changes in $P_1$ and $P_3$.

The pressure differential, $P_1 - P_2$, is kept nearly constant by changing the size of the variable orifice $A_{02}$ in response to changes in $P_1$ and/or $P_3$. Variation in orifice area $A_{02}$ is caused by shifting of the spool.

The pressure differential, $P_1 - P_2$, is related to flow rate and the equilibrium position of the spool, which is determined by equation (5). Referring to equation (5), the influx fluid velocity, $V_1$, may be ignored for practical purposes. The efflux jet velocity, $V_2$, is a function of the flow rate, $Q$, and the variable orifice, $A_{02}$, which is in turn a function of the spool position, $x$.

$$V_2 = Q/(C_v A_{02}) = f(Qx)$$

Where $C_v$ = discharge coefficient
In the same manner, spring force, $F_s$, is a function of the spool position, $x$.

$$F_s = k_s(X_1 + x) = q(k_s x)$$

Where $k_s$ = spring stiffness
$X_1$ = initial compression
Equation (5) can now be rewritten as $$P_1 = P_2 = [K_s(X_1+x) - \rho Q^2 \cos\theta/(C_v A_{02})]/A_{p1}$$

It becomes clear that accuracy for the control of flow rate is determined mainly by the delicate balance of spring force and flow induced force $[PQ^2\cos\theta/(C_v A_{02})]$. The former is related to the initial spring tension and spring stiffness; the latter is associated with the flow rate and geometric configuration of the variable orifice $A_{02}$.

Although the invention has been described in connection with certain specific embodiments, the principles are susceptible of numerous other applications that will readily occur to those skilled in the art. The invention is, therefore, to be limited only as indicated by the scope of the appended claims.

Having thus described the various features of the invention, what I claim as new and desire to secure by Letters Patent is:

I claim:

1. A control valve device for supplying a constant rate of fluid to a hydraulic means and for releasing fluid from said hudraulic means comprising:
    a first port means receiving a flow of pressurized fluid;
    a second port means discharging a flow of pressurized fluid;
    a connecting passage means joining said first and said second port means;
    a pressure operated spool means having at least two effective surface means and moving in one or the other of two opposite directions controlling flow through said port means; and
    a flow sensing means including a valve means located in said connecting passage for creating a pressure difference thereacross, said pressure difference being communicated to said effective surface means, a channel means being employed therefore from said first port means to a first of said effective surface means.

2. The control valve device of claim 1 wherein the second of said effective surface means of said spool means is connected with said connecting passage means by a second channel means whereby said second effective surface is responsive to said pressure difference.

3. The control valve device of claim 1 wherein said valve means has a central bore and is pivotable.

4. The control valve device of claim 3 wherein said central bore of said valve has a bellshaped end.

5. The control valve device of claim 2 wherein said connecting passage means includes:
    a delivery passage means extending between said flow sensing means and said second channel means; and
    a bore means wherein said pressure operated spool means is located.

6. The control valve device of claim 1 wherein said pressure operated spool journals and is secured to a spring means, whereby said spring maintains said spool in a neutral position.

7. The control valve device of claim 6 wherein said pressure operated spool journals and is secured to a plurality of spring means, whereby force of movement in one or the other direction is different.

8. A control valve device for supplying a constant rate of fluid to a hydraulic means and for releasing fluid from said hydraulic means comprising:
    a first port means adapted to receive a flow of pressurized fluid;
    a second port means adapted to discharge a flow of pressurized fluid;
    a connecting passage joining said first and said second port means and including a bore means and a delivery means;
    a spool means, located in said bore means, and having at least two effective surface means;
    a spring means urging said spool means into a neutral position;
    a valve means having an adjustable orifice located adjacent said first port means intersecting said delivery passage creating a pressure difference thereacross; and
    at least two channel means located on different sides of said valve means communicating said pressure differences to said effective surface means whereby movement of said spool means is prompted by said pressure differences.

9. A control valve device for supplying a constant rate of fluid to a hydraulic means and for releasing fluid from said hydraulic means comprising:
    a first port means;
    a second port means;
    a bore means adjacent and connected to said second port means;
    a delivery passage connecting said first port means and said bore means;
    a spool means having first and second end sections said ends being effective surface means slidable in said bore between a neutral position and a range of flow positions;
    a spring means positioned in said bore urging said spool means to a neutral position;
    a removable plug means sealing said bore and preloading said spring means;
    a valve means having an adjustable orifice located adjacent said first port means, intersecting said delivery passage creating a controllable pressure differential thereacross; and
    a first and second channel means communicating said pressure difference to said first and second ends of said spool, said first channel means being located between said first port means and said valve means and communicating to said first end and said second channel means being located between said delivery passage and said bore means and communicating to said second end.

* * * * *